(12) United States Patent
Jackson

(10) Patent No.: US 7,334,777 B2
(45) Date of Patent: Feb. 26, 2008

(54) AUTOMOBILE PNEUMATIC JACKING SYSTEM, THAT HAS INTEGRATED SAFETY FEATURES AS WELL AS EXTERNAL SAFETY ADAPTER, FOR THE PURPOSE OF CONVENIENTLY AND SAFELY SUSPENDING A TIRE OFF THE GROUND FOR CHANGING AND/OR REPAIRING

(75) Inventor: Clinton Lemont Jackson, St. Louis, MO (US)

(73) Assignee: Rojack LLC

( * ) Notice: Subject to any disclaimer, the term of this patent is extended or adjusted under 35 U.S.C. 154(b) by 0 days.

(21) Appl. No.: 11/362,996

(22) Filed: Feb. 27, 2006

(65) Prior Publication Data

US 2007/0102688 A1    May 10, 2007

Related U.S. Application Data

(63) Continuation-in-part of application No. 10/735,780, filed on Dec. 16, 2003, now Pat. No. 7,004,457.

(51) Int. Cl.
*B60S 9/02* (2006.01)
(52) U.S. Cl. ................................ 254/423; 254/418
(58) Field of Classification Search ............. 254/423, 254/418, 93 H, 89 H
See application file for complete search history.

(56) References Cited

U.S. PATENT DOCUMENTS

| | | | | |
|---|---|---|---|---|
| 4,815,711 | A * | 3/1989 | Bruno et al. | 254/423 |
| 5,722,641 | A * | 3/1998 | Martin et al. | 254/423 |
| 6,237,953 | B1 * | 5/2001 | Farmer | 280/763.1 |
| 6,832,402 | B1 * | 12/2004 | Drago et al. | 7/100 |
| 2005/0127343 | A1 * | 6/2005 | Jackson et al. | 254/423 |

* cited by examiner

*Primary Examiner*—Lee D. Wilson

(57) ABSTRACT

An automobile pneumatic jacking system, that has integrated safety features as well as external safety adapters, for the purpose of conveniently and safely suspending a tire off the ground for changing and/or repairing.

15 Claims, 8 Drawing Sheets

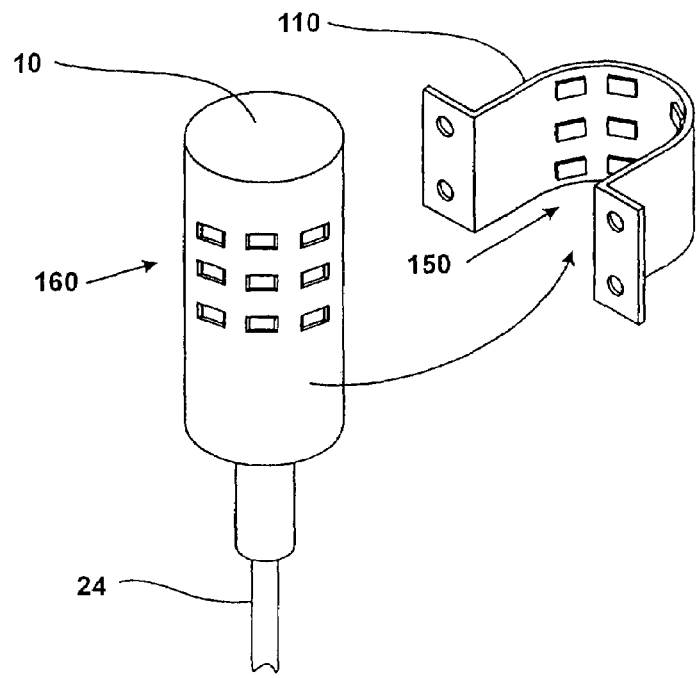
Fig. 3D PRIOR ART
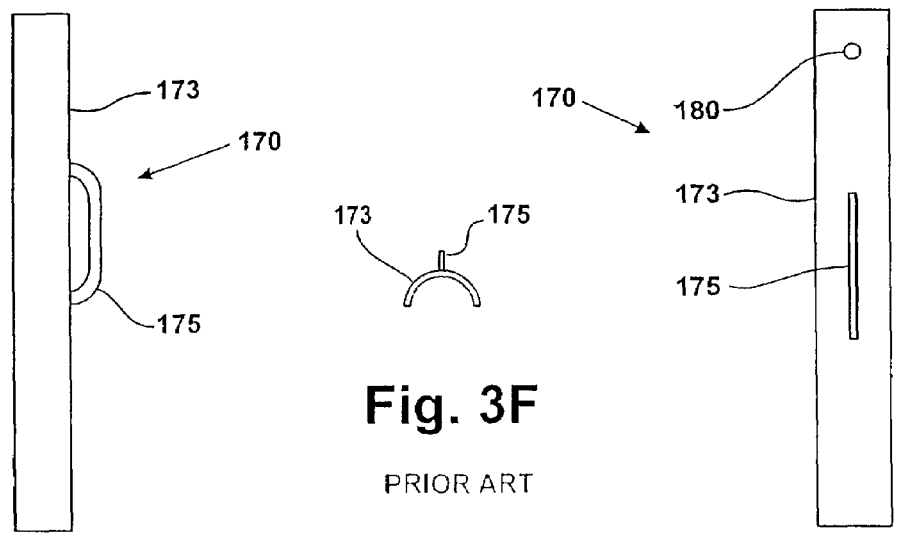
Fig. 3E
PRIOR ART
Fig. 3F
PRIOR ART
Fig. 3G
PRIOR ART

AUTOMOBILE PNEUMATIC JACKING SYSTEM, THAT HAS INTEGRATED SAFETY FEATURES AS WELL AS EXTERNAL SAFETY ADAPTER, FOR THE PURPOSE OF CONVENIENTLY AND SAFELY SUSPENDING A TIRE OFF THE GROUND FOR CHANGING AND/OR REPAIRING

I. REFERENCE TO RELATED APPLICATION

This application is a continuation-in-part of application Ser. No 10/735,780, filed Dec. 16, 2003 now U.S. Pat. No. 7,004,457.

II. FIELD OF THE INVENTION

The present invention relates to prior art of pneumatic lift systems and more specifically to an automobile pneumatic jack assembly that lifts a vehicle and conveniently suspends a tire off the ground for changing and/or repairing.

III. BACKGROUND OF THE INVENTION

There are available various conventional automobile tire suspending lift mechanisms that do not provide the safe, simple, and cost effective method of the present invention.

Known prior art pneumatic vehicle jack systems include U.S. Pat. No. 4,174,094, U.S. Pat. No. 4,706,937, U.S. Pat. 4,993,688, and U.S. Pat. No. 5,232,206.

While those prior art systems contain similar characteristics but in reference to the advantages of the present invention, there is a distinction that this present invention offers unique safety features that are neglected in prior art.

II. SUMMARY OF THE INVENTION

A. Objects of the Invention

One objective of the present invention is to provide a novel pneumatic jack system that utilizes the four quadrants of an automobile and to provide a clear process of communication by use of indicators that is herein described.

Second objective of the present invention is to provide improved safety while a vehicle is suspended on the jack system.

Third objective is to provide an automobile tire suspending lift mechanism that provided a safe, simple and cost effective jack system.

Fourth objective of the present invention is to provide a pneumatic jacking system for an automobile that will safely and conveniently lift a tire off the ground for repair or to change a tire. Additional objectives of the present invention are to overcome the following disadvantages of prior art hydraulic systems:

1. A. The hydraulic fluid is non-biodegradable, making it environmentally unfriendly.
2. B. Hydraulic systems are substantially heavier than pneumatic systems.

Another object of the present invention is to provide a pneumatic assembly that will safely and conveniently suspend a tire of an automobile off the ground for changing and/or repairing said tire.

Another object of the present inversion is to give clear communication of the process by use of indicators.

The objective of this present invention is to accomplish these tasks in an environmentally friendly way.

B. SUMMARY

A primary objective of the present invention is to provide a pneumatic jacking system for an automobile that will safely and conveniently lift a tire off of the ground to repair or change said tire. An additional objective of the present invention is to overcome the following disadvantages of prior art, namely hydraulic systems:

1. The hydraulic fluid is non-biodegradable, making it environmentally unfriendly.
2. Hydraulic systems are substantially heavier than pneumatic systems.

The general purpose of the present invention is to provide a pneumatic assembly that will safely and conveniently suspend a tire of an automobile off of the ground for changing and/or repairing said tire and to give a clear communication of the process by use of indicators, accomplishing this task in an environmentally friendly way.

IV. THE DRAWINGS

FIG. 3D is a perspective view of the pneumatic cylinder and mounting bracket showing the interlocking system.

FIG. 3E is a side view of the safety strut.

FIG. 3F is an end view of the safety strut.

FIG. 3G are a front view of the safety strut.

V. DESCRIPTION OF PREFERRED EMBODIMENTS

Figure 1:
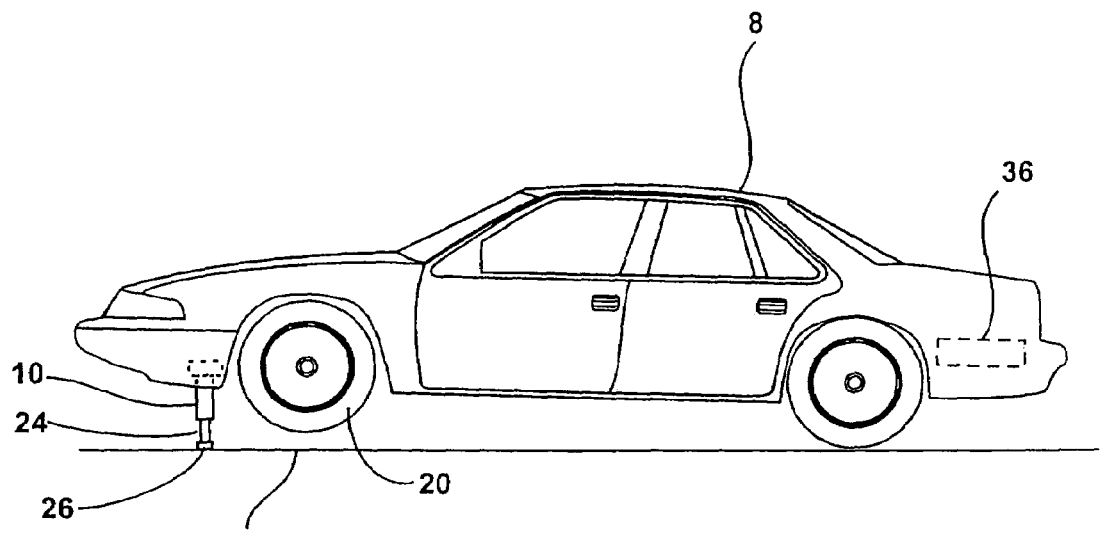
FIG. 1 is a side view of a pneumatic automobile jack system that encompasses all the dynamics of the present invention.

FIG. 1 illustrates a typical vehicle 8 with one tire 20 of the ground 80. The lifting apparatus comprises cylinder 10 and piston rod 24. Footplate 26 contacts the ground 80 to provide a broad base and reduce the possibility of the lifting apparatus sinking into the ground 80.

Figure 2:
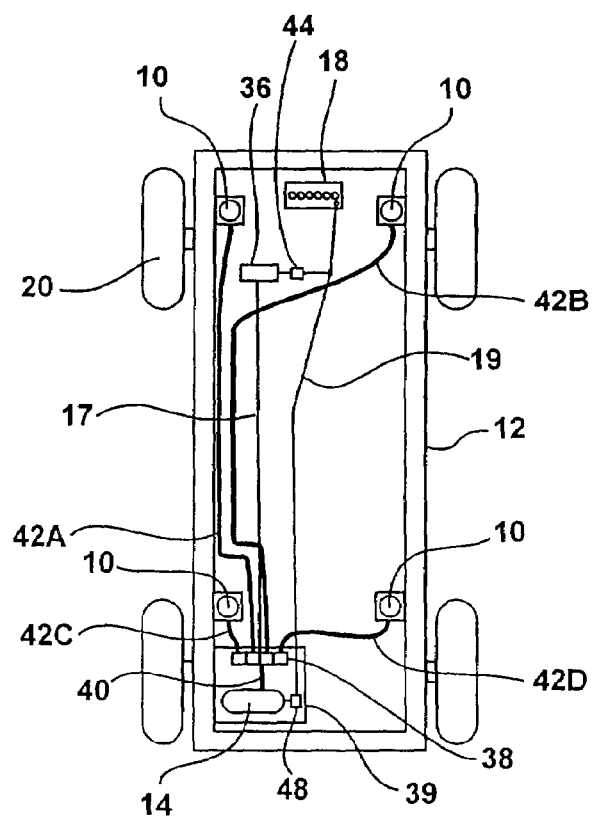
FIG. 2 is a top view of an automotive frame showing all components of the present invention as installed.

FIG. 2 illustrates a motor vehicle frame 12 showing all major components of the present invention. Enclosure 39 is typically mounted at the rear of the vehicle, and contains compressor 14, relay 48, and 4-way distribution manifold 38. Cylinders 10 maybe mounted to the inside of frame 12 by means of welding or mechanical fasteners. Airlines 42A, 42B, 42C, and 42D connects each cylinder 10 to solenoids 16A 16B, 16C, and 16D (FIG. 4A), which are contained within 4-way distribution manifold 38.

Battery 18 (FIG. 2) provides electrical power via supply wiring 19 to control box 36 and relay 48. Relay 48 provides power to compressor 14 when commanded by control box 36 and control wiring 17, as detailed in this description.

Figure 3:
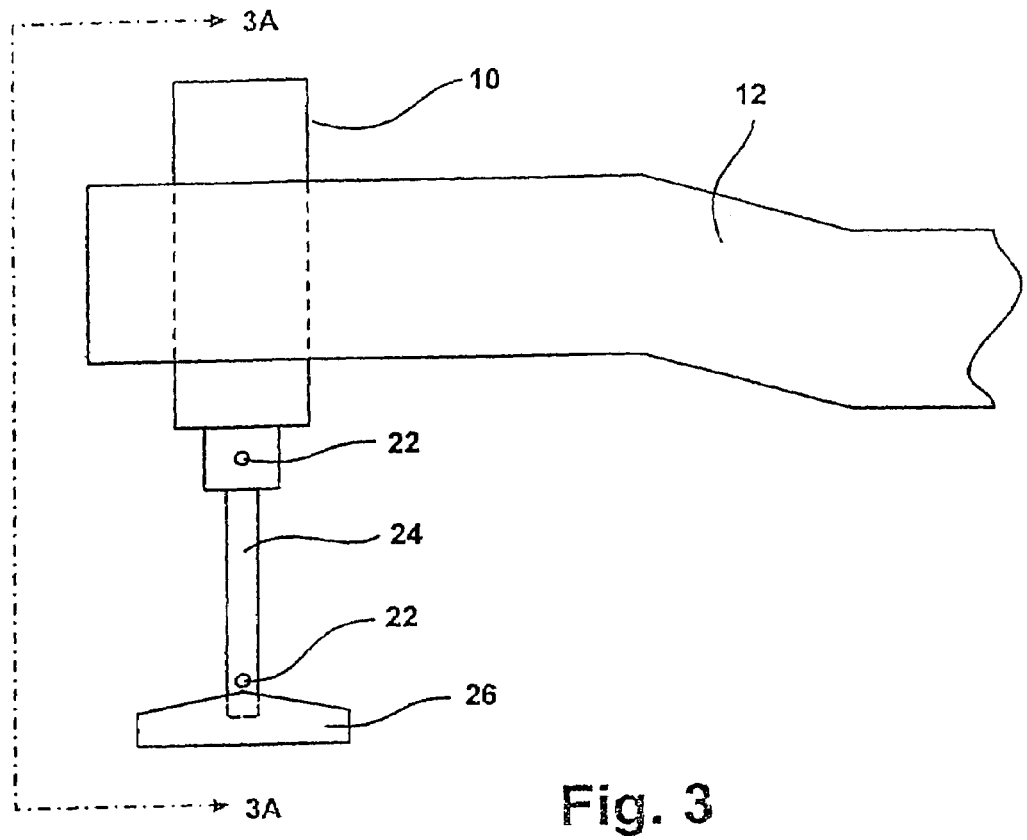
FIG. 3 is a side view of an automobile frame showing one lift mechanism of the present invention in its extended position.
Figure 3A:
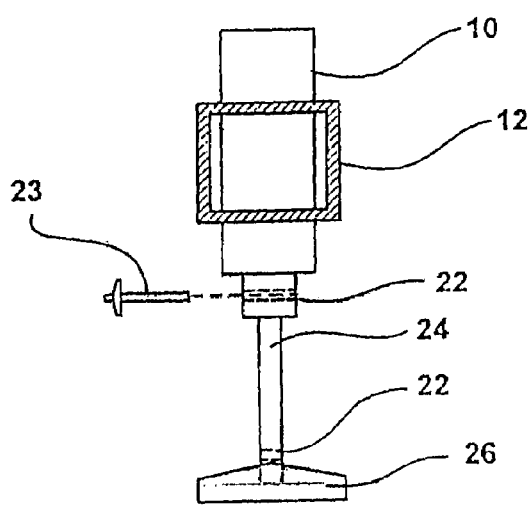
FIG. 3A is a front section view of an automobile frame showing one lift mechanism of the present invention in its extended position.

According to FIGS. 3 and 3A, cylinder 10 is mounted through frame 12 by means of welding or mechanical fasteners. Piston rod 24 is shown in its extended position. Holes 22 are provided for purposes of inserting pin 23 in either the extended or retracted position to provide additional safety.

Figure 3B:
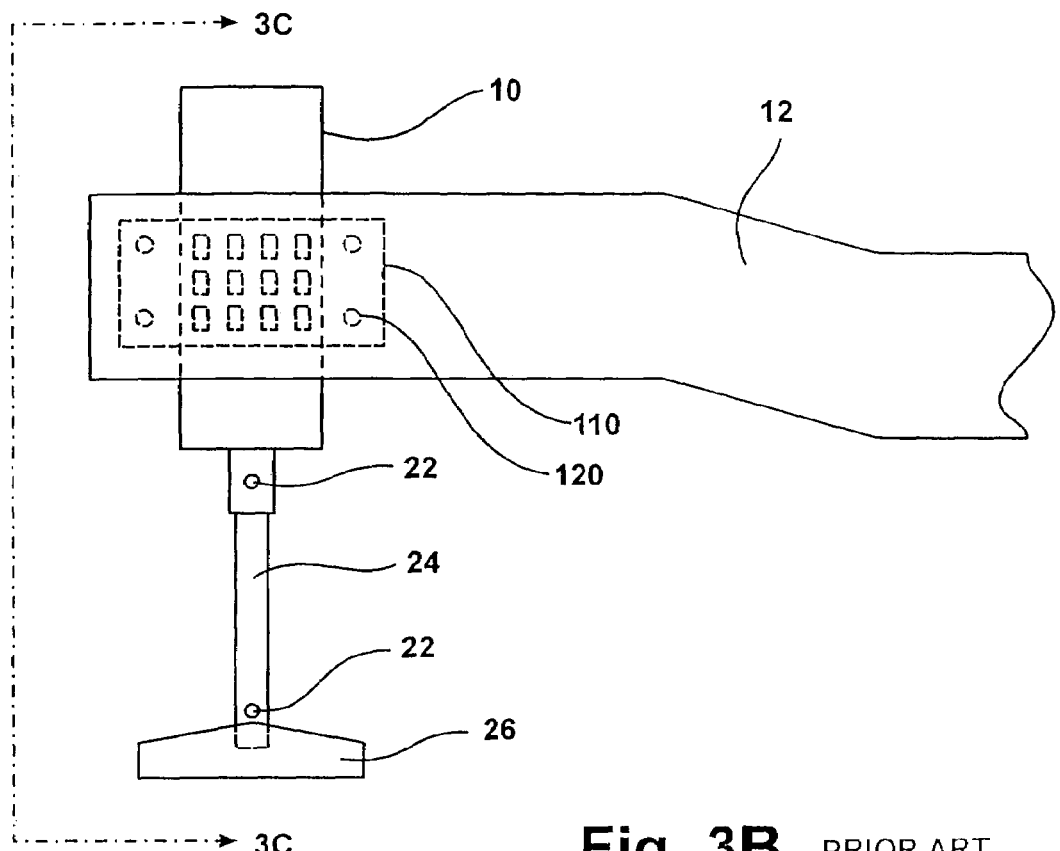
FIG. 3B is a side view of an automobile frame showing the improved lift mechanism of the present invention in its extended position.
Figure 3C:
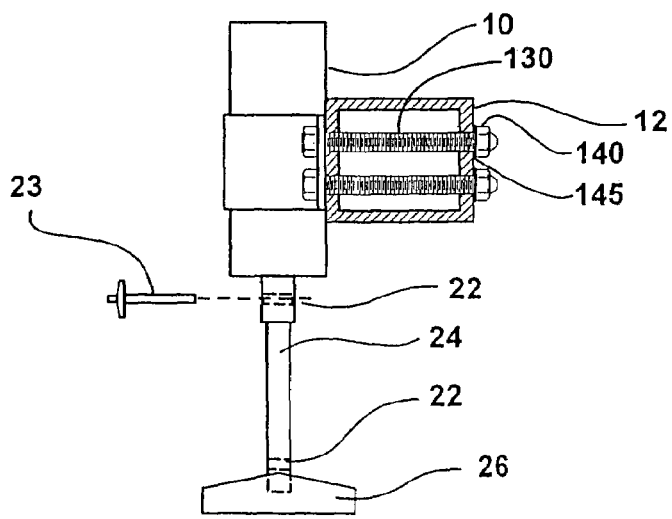
FIG. 3C is a front section view of an automobile frame showing the improved lift mechanism of the present invention in its extended position.

According to FIGS. 3B and 3C, cylinder 10 is mounted to the surface of frame 12 by means of mounting bracket 110. Mounting bracket 110 contains holes 120 to provide means for bolts 130, washers 145, and nuts 140 to secure mounting bracket 110 to frame 12. Piston rod 24 is shown in its extended position. Holes 22 are provided for purposes of inserting pin 23 in either the extended or retracted position to provide additional safety.

According to FIG. 3D, mounting bracket 110 has male locating tabs 150, which fit into female locating slots 160 in cylinder 10 (rotated 90 degree for clarity).

Figure 3H:
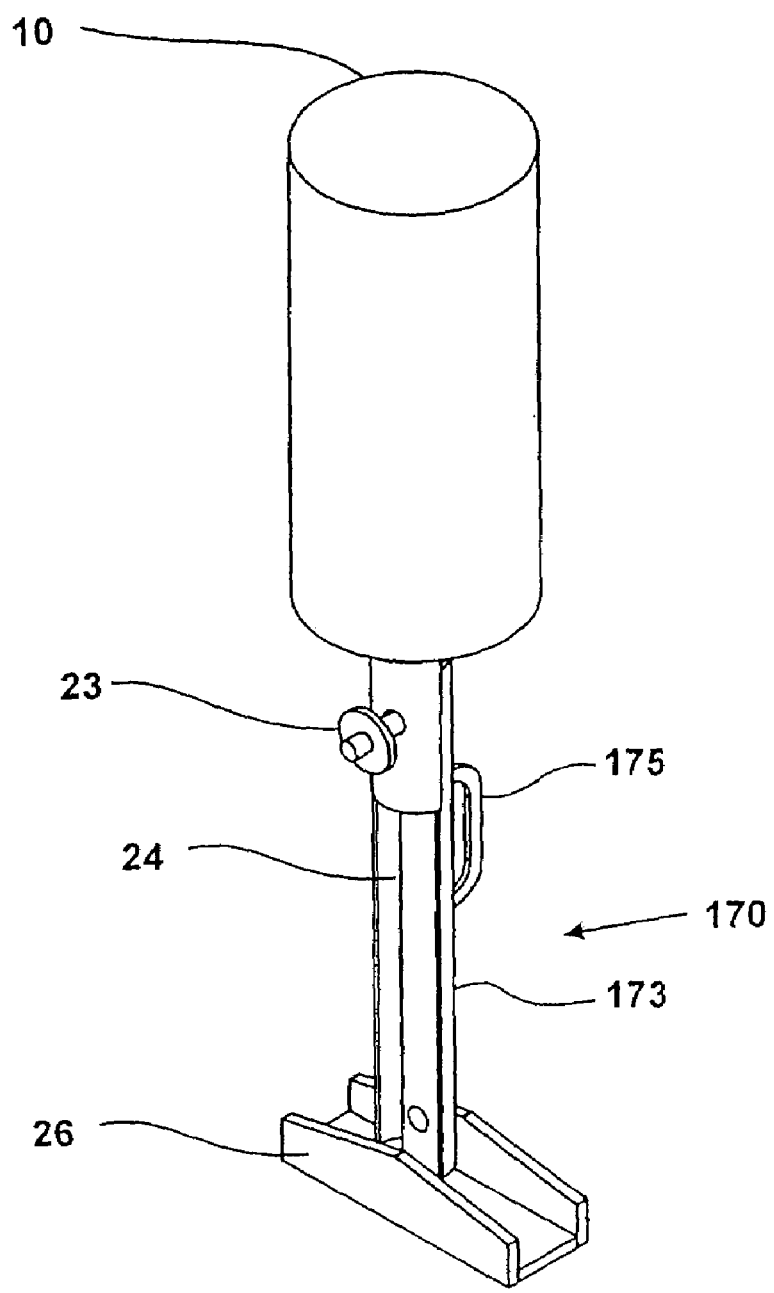
FIG. 3H is a perspective view of the safety strut in use.

Safety Strut 170 (FIGS. 3E, 3F, 3G, and 3H), comprises body 173, handle 175, which are held together by means of welding or mechanical fasteners and pin holes 180 which are provided to insert pins through the body 173 and piston rod holes 22 to provide additional safety of the piston rod 24 in its extended position. Safety Strut 170 if preferably made of plastic, steel or heavy aluminum. Body 173 is curved to fit around piston rod 24 when it is fully extended (FIG. 3H,) preventing piston rod 24 from inadvertently retracting into cylinder 10. Safety strut 170 is secured to cylinder 10 by means of pin 23.

Figure 4:
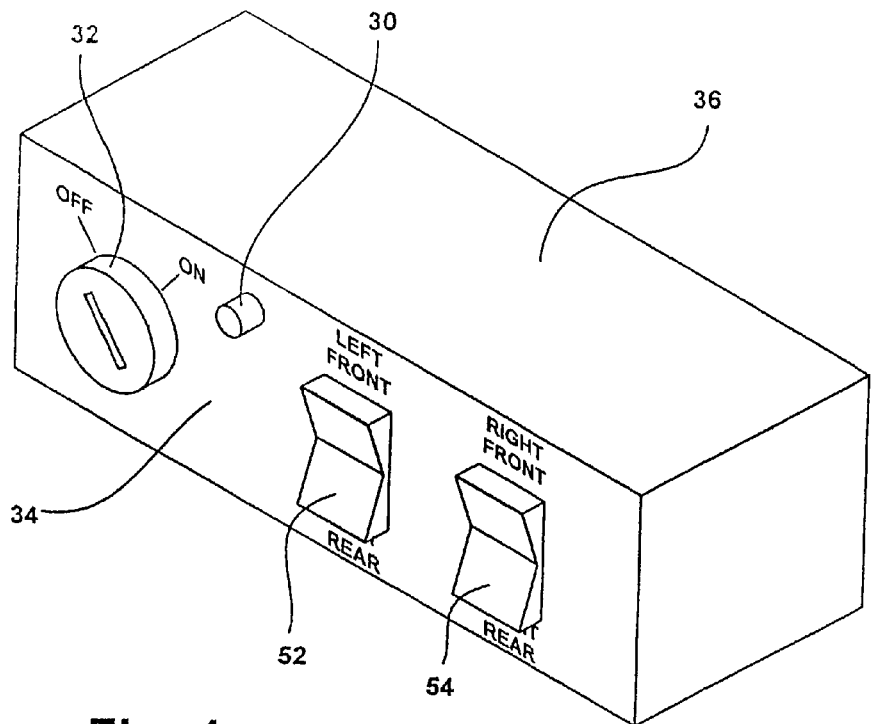
FIG. 4 is a perspective view of the control box assembly.

According to FIG. 4, control panel 34 is mounted to the front of control Box 36. Control panel 34 provides mounting controls and indicators as follows: key-switch 32, light emitting diode (LED) 30, and single pole, double throw (SPDT) switches 52, 54.

Figure 4A:
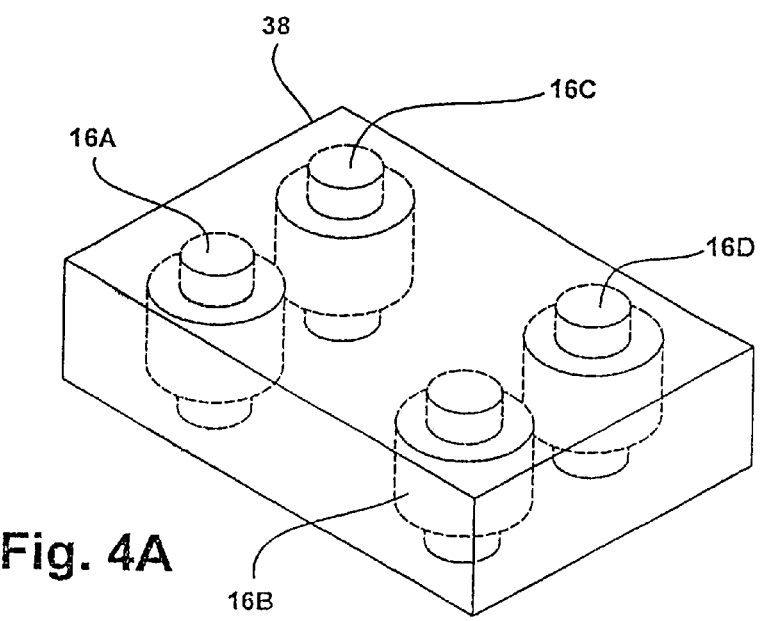
FIG. 4A is a perspective view of the pneumatic manifold assembly showing the four pneumatic solenoids in phantom view.

According to FIG. 4A, 4-way distribution manifold 38 contains four solenoids 16A, 16B, 16C, and 16D. 4-way distribution manifold 38 provides means to evenly distribute air from the compressor 14 to solenoids 16A, 16B, 16C, and 16D.

Figure 5:
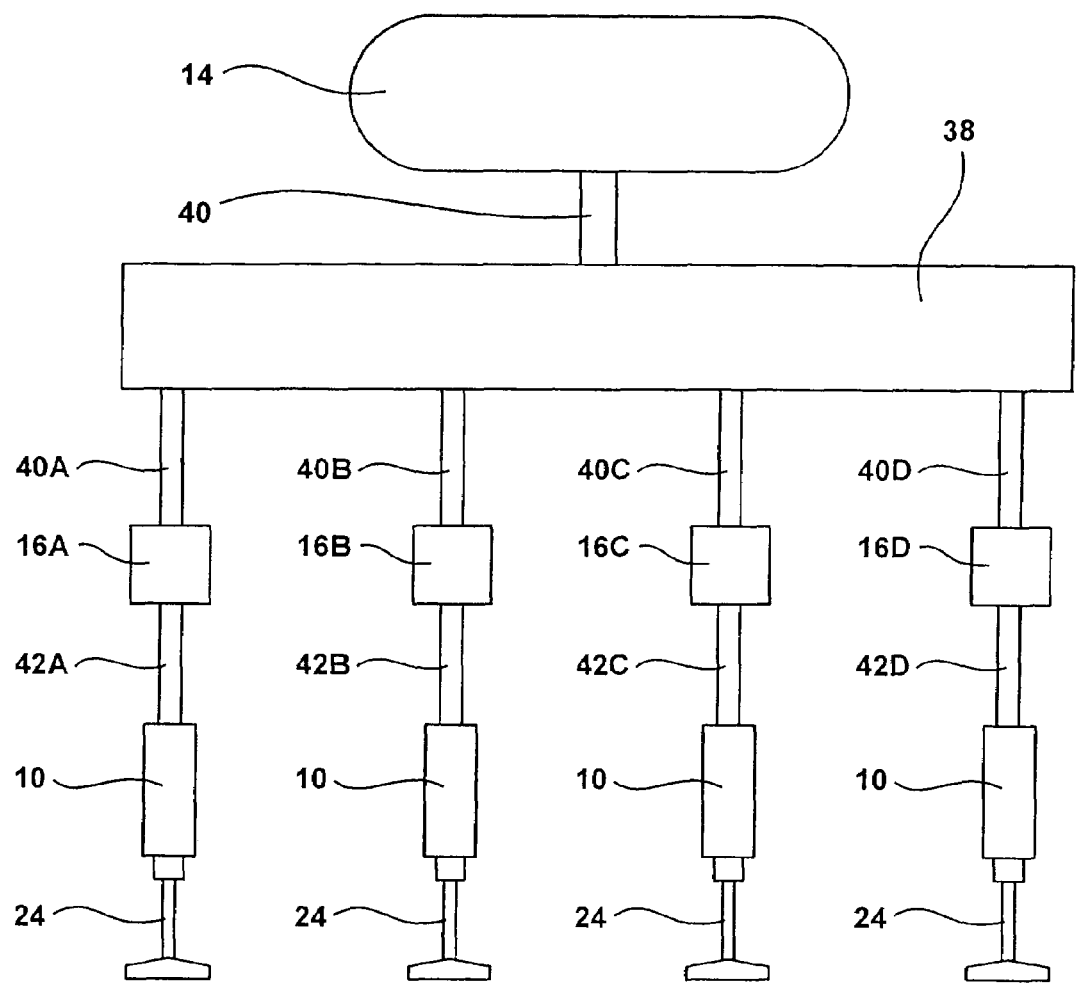
FIG. 5 is a pneumatic schematic of the present invention.

FIG. 5 is schematic representations of pneumatics contained in the present invention.

Compressor 14 provides air to 4-way distribution manifold 38 via airline 40. Air is routed to solenoids 16A, 16B, 16C, and 16D via airlines 40A, 40B, 40C, and 40D, respectively. Upon activation solenoids 16A, 16B, 16C, and 16D provide air pressure to cylinders 10 via airlines 42A, 42B, 42C, and 42D, respectively.

Figure 6:
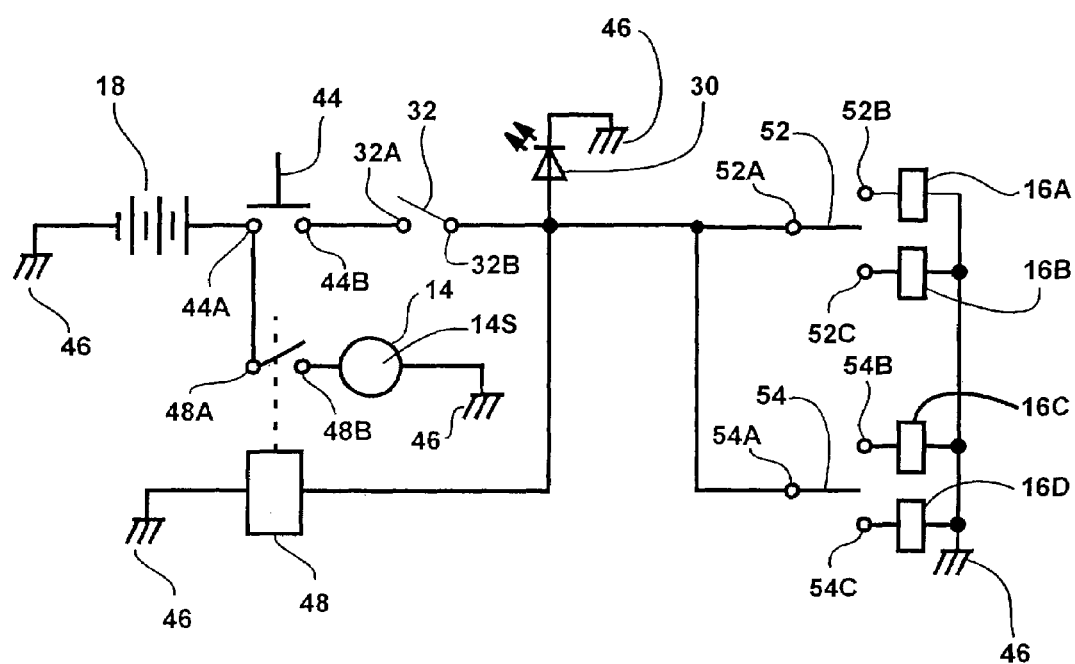
FIG. 6 is an electrical schematic of the present invention.

FIG. 6 is an electrical schematic of the present invention. Electrical power From battery 18 is routed to contact 48A of solenoid 48, as well as contact 44A of the interlock switch 44, which is connected to the parking brake of vehicle 8. When the parking brake is applied, interlock switch 44 closes, routing electrical power to key switch 32 contact 32A via interlock switch 44 contacts 44A, 44B. Prior to use, the operator removes pin 23 (FIG. 3A) from hole 22. When key switch 32 (FIG. 6) is turned to the ON position, electrical power is routed via contacts 32A and 32B to solenoid 48, LED 30, and contacts 52A and 52B of SPDT switches 52 and 54, respectively. When solenoid 48 receives electrical power, contacts 48A and 48B close, delivering high-current electrical power to compressor 14, activating it. Compressor 14 is commercially available unit that provides suitable air pressure to lift one or more of vehicles 8's wheels 20 off the ground 80. A built-in pressure switch allows compressor 14 to shut off when the desired air pressure is attained.

When LED 30 receives electrical power it illuminates, indicating to the operator that the system is powered up and ready to use.

SPDT switches 52, 54, (FIGS. 4 and 6) are three-position rocker switches, with the center position used as the OFF position. When SPDT switch 52 is moved to the LEFT FRONT position, electrical power is routed from contact 52A (FIG. 6) to contact 52B, delivering electrical power to solenoid 16A. Solenoid 16A then allows air pressure to be routed to cylinder 10 via air line 42A, lifting the left front tire of vehicle 8 off of the ground 80.

Typically, the operator will then insert pin 23 (FIG. 3A) into hole 22, preventing piston rod 24 from retracting. After desired repairs are carried out, the operator removes pin 23 (FIG. 3A) from hole 22, allowing piston rod 24 to retract. Moving SPTD switch 52 (FIGS. 4 and 6) to the center (OFF) position removes Electrical power form solenoid 16A (FIG. 6), permitting it to bleed air pressure from cylinder 10, lowering tire 20 to the ground 80. The operator then inserts pin 23 (FIG. 3A) into hole 22, preventing piston rod 24 from lowering.

In like manner, SPDT switch 52 (FIGS. 4 and 6) activates solenoid 16B to raise the left rear of vehicle 8. Depending upon its position SPDT switch 54 activates solenoids 16C and 16D, raising the front or right rear of vehicle 8. Electrical chassis grounds 46 are provided for all electrical elements of the present invention.

Electrical chassis grounds 46 are provided for all electrical elements of the present invention.

The invention claimed is:

1. An automobile pneumatic jack assembly comprising:
   a plurality of pneumatic cylinder assemblies,
   at least one air compressor,
   at least one distribution manifold assembly,
   at least one safety device comprising at least one safety strut having at least one pin which mechanically prevents said pneumatic cylinder assemblies from inadvertently retracting; and
   electrical control means to control said pneumatic cylinder assemblies,
   said air compressor, said distribution manifold assembly and said safety strut, thereby preventing said pneumatic cylinder assemblies from inadvertently retracting, wherein said air compressor is a commercially available unit that uses available vehicle electrical power and is capable of providing adequate air pressure to lift a vehicle to a suitable height, to allow repairs to tires and said other automobile parts; said distribution manifold assembly receives air pressure from said air compressor and delivers said air pressure to said pneumatic cylinders via pneumatic solenoids.

2. An automobile pneumatic jack assembly according to claim 1 wherein
   said pneumatic cylinder assemblies comprise one to four pneumatic cylinders adapted to be mounted at various locations on an automobile chassis.

3. An automobile pneumatic jack assembly according to claim 2 wherein said pneumatic cylinder assemblies are mounted to the automobile chassis by means selected from the group of welding, brazing and mechanical fasteners.

4. An automobile pneumatic jack assembly according to claim 2 wherein said pneumatic cylinder assemblies are capable of lifting a vehicle to a sufficient height to allow repairs to fires and other parts.

5. An automobile pneumatic jack assembly accord~ to claim 1 wherein said air compressor is mounted within the vehicle, permitting efficient routing of pneumatic and electrical supplies.

6. An automobile pneumatic jack assembly accord~ to claim 1 wherein said distribution manifold assembly contains a plurality of said pneumatic solenoids, one for each of the said pneumatic cylinders.

7. An automobile pneumatic jack assembly according to claim 6 wherein
each of the said pneumatic solenoids operate on electrical power and direct air pressure to said corresponding pneumatic cylinder.

8. An automobile pneumatic jack assembly according to claim 1 where said electrical controls comprise a power relay, a control box, and an electrical interlock switch.

9. An automobile pneumatic jack assembly according to claim 8 wherein said electrical interlock switch is activated when the vehicle's parking brake is applied, ensuring the vehicle is secured prior to system operation.

10. An automobile pneumatic jack assembly according to claim 9 wherein said control box contains switching and indicating circuitry for the operator.

11. An automobile pneumatic jack assembly according to claim 10 wherein said control box contains a key switch that provides extra safety to ensure the system is not accidentally activated.

12. An automobile pneumatic jack assembly according to claim 11 wherein said control box contains a plurality of three-position rocker switches to direct electrical power to said pneumatic solenoids when activated by the operator.

13. An automobile pneumatic jack assembly according to claim 8 wherein said control box contains a light emitting diode (LED) that illuminates when power is applied to the system.

14. An automobile pneumatic jack assembly according to claim 13 wherein said power relay is activated by low-current voltage when commanded by the operator and applies high-current voltage to said air compressor.

15. An automobile pneumatic jack assembly according to claim 14 wherein said power relay reduces the need to run high current carrying wiring to said control box, and allows the use of low-current components.

\* \* \* \* \*